United States Patent
Daniel et al.

(10) Patent No.: US 9,641,385 B1
(45) Date of Patent: May 2, 2017

(54) DYNAMIC SYSTEM CONFIGURATION IN A VIRTUAL ENVIRONMENT

(71) Applicant: Amazon Technologies, Inc., Reno, NV (US)

(72) Inventors: Mathew Daniel, Johannesburg (ZA); Marcin Piotr Kowalski, Cape Town (ZA); Andries Petrus Johannes Dippenaar, Cape Town (ZA)

(73) Assignee: Amazon Technologies, Inc., Reno, NV (US)

( * ) Notice: Subject to any disclaimer, the term of this patent is extended or adjusted under 35 U.S.C. 154(b) by 189 days.

(21) Appl. No.: 14/107,901

(22) Filed: Dec. 16, 2013

(51) Int. Cl.
*G06F 15/177* (2006.01)
*H04L 12/24* (2006.01)

(52) U.S. Cl.
CPC ................. *H04L 41/0806* (2013.01)

(58) Field of Classification Search
CPC ......... G06F 9/45533; G06F 2009/4557; H04L 12/2634; H04L 67/1014; H04L 67/34
USPC ........................................................ 709/220
See application file for complete search history.

(56) References Cited

U.S. PATENT DOCUMENTS

| | | | | |
|---|---|---|---|---|
| 8,352,608 B1 * | 1/2013 | Keagy | ........................ | G06F 8/63 709/220 |
| 8,352,941 B1 * | 1/2013 | Protopopov | ........ | G06F 9/45558 718/1 |
| 8,850,442 B2 * | 9/2014 | Davis | .................... | G06F 9/5077 709/226 |
| 9,210,173 B2 * | 12/2015 | Ferris | .................. | G06F 21/6218 |
| 2007/0271560 A1 * | 11/2007 | Wahlert | ..................... | G06F 8/61 718/1 |
| 2010/0269109 A1 * | 10/2010 | Cartales | ................ | G06F 9/5072 718/1 |
| 2011/0154320 A1 * | 6/2011 | Verma | ....................... | G06F 8/63 718/1 |
| 2013/0332610 A1 * | 12/2013 | Beveridge | ............. | G06F 9/4445 709/226 |

(Continued)

OTHER PUBLICATIONS

Bourdeau, R., "Dynamically Configure and Provision Logical Network Services," VMware Blogs, blogs.vmware.com, Oct. 17, 2013.

(Continued)

*Primary Examiner* — Phuoc Nguyen
(74) *Attorney, Agent, or Firm* — Klarquist Sparkman, LLP

(57) ABSTRACT

An example method of launching a virtual machine in a multi-tenant environment using dynamic configuration may include receiving a customer request to launch a virtual machine in the multi-tenant environment. The multi-tenant environment may include a plurality of host server computers. In response to the customer request, configuration parameters stored in association with an account of the customer may be retrieved in the multi-tenant environment. One or more parameters of a hardware and/or a software resource in the multi-tenant environment may be dynamically configured in accordance with the retrieved configuration parameters. The virtual machine may be launched on one of the plurality of host server computers, using the configured hardware and/or software resource. The configuration parameters may be associated with at least one desired performance characteristic of the virtual machine to be launched.

23 Claims, 11 Drawing Sheets

(56) References Cited

U.S. PATENT DOCUMENTS

| | | | |
|---|---|---|---|
| 2013/0332927 A1* | 12/2013 | Tang .................. | G06F 9/45545 718/1 |
| 2014/0075013 A1* | 3/2014 | Agrawal ............. | G06F 11/3495 709/224 |
| 2014/0258535 A1* | 9/2014 | Zhang ................ | H04L 41/0806 709/226 |
| 2015/0007175 A1* | 1/2015 | Potlapally ........... | G06F 9/45533 718/1 |
| 2015/0052614 A1* | 2/2015 | Crowell ............... | G06F 21/566 726/25 |

OTHER PUBLICATIONS

"Configuration Maxiumums: VMware® vSphere 5.5," VMware, Inc., Palo Alto, CA, copyright 2013, 9 pages.
"Server Configuration Guide: ESX Server 3.0.1 and VirtualCenter 2.0.1," VMware®, Inc., Palo Alto, CA, copyright 2007-2009, 312 pages.
"VMware vCenter Server 4: Unify and Simplify Virtualization Management," VMware, Inc., Palo Alto, CA, copyright 2009, 2 pages.

\* cited by examiner

DYNAMIC SYSTEM CONFIGURATION IN A VIRTUAL ENVIRONMENT

BACKGROUND

Cloud computing is the use of computing resources (hardware and software) that are available in a remote location and accessible over a network, such as the Internet. In a computing environment with many computing devices, such as a virtual server or cloud computing environment with many server computers, the use of computing resources can provide a number of advantages including cost advantages and/or the ability to adapt rapidly to changing computing resource needs. Therefore, the computing resources, such as the host server computers, in the cloud computing environment need to be configured optimally. However, configuration of computing resources in the cloud environment can be challenging.

For example, some cloud computing or virtual server environments provide a limited number of pre-defined categories of computing resources for customer selection, but with little or no possibility for tenant customizations. Additionally, while it is desirable for tenants to reserve and configure computing resource capacity for future need, it is also desirable that such reserved computing resource capacity is utilized efficiently so as to maximize profitability and tenant/customer satisfaction.

DETAILED DESCRIPTION

A virtual machine image contains an operating system (e.g., Linux) and other data needed to launch a virtual machine in a virtual environment. The virtual machine image is similar to a physical computer's disk volume, and may include a file system, the operating system and other components needed to boot up as a machine. In order to launch a virtual machine, hardware needs to be selected. The hardware selection may be accomplished through instance types, which may allow a variety of different sizes of memory, CPU capacity, I/O performance, and so forth. The combination of the virtual machine image and the instance type can be used to create an "instance" or a virtual machine, which may be launched on a cloud computing resource, such as a host server computer.

The following description is directed to techniques and solutions supporting dynamic system configuration. Traditionally, hardware configuration for a customer instance is fixed and may be done at server build time. In an embodiment of the disclosure, configuration of computing resources in a virtual multi-tenant environment may be performed dynamically at instance launch time. For example, a configuration control policy may be associated with a tenant (or customer), where the control policy may specify various requirements (or configuration parameters) associated with hardware and/or software used within the multi-tenant environment, as well as configuration parameters associated with one or more instances launched at the request of the tenant. The control policy may be used in accordance with an instance launch request so that configuration parameters of the hardware, software and/or the instance may be implemented as indicated by the policy. In some instances, computing resources (e.g., a host server computer) may be initially allocated for instance launching based on one or more performance metrics collected from a plurality of servers in the multi-tenant environment. Performance metrics may include metrics measured/reported by one or more sensors in the multi-tenant environment, which metrics relate to physical characteristics (e.g., temperature, power consumption, etc.) and/or performance characteristics (e.g., disk volume, throughput, I/O operations per second, etc.) associated with one or more hardware resources within the multi-tenant environment.

After a host server computer is initially selected based on the performance metrics, the configuration control policy may be used to tweak settings of hardware, software and/or instance characteristics prior to launching the instance on the selected host server computer. Other examples of dynamic system configuration in the multi-tenant environment are described herein below.

Figure 1:
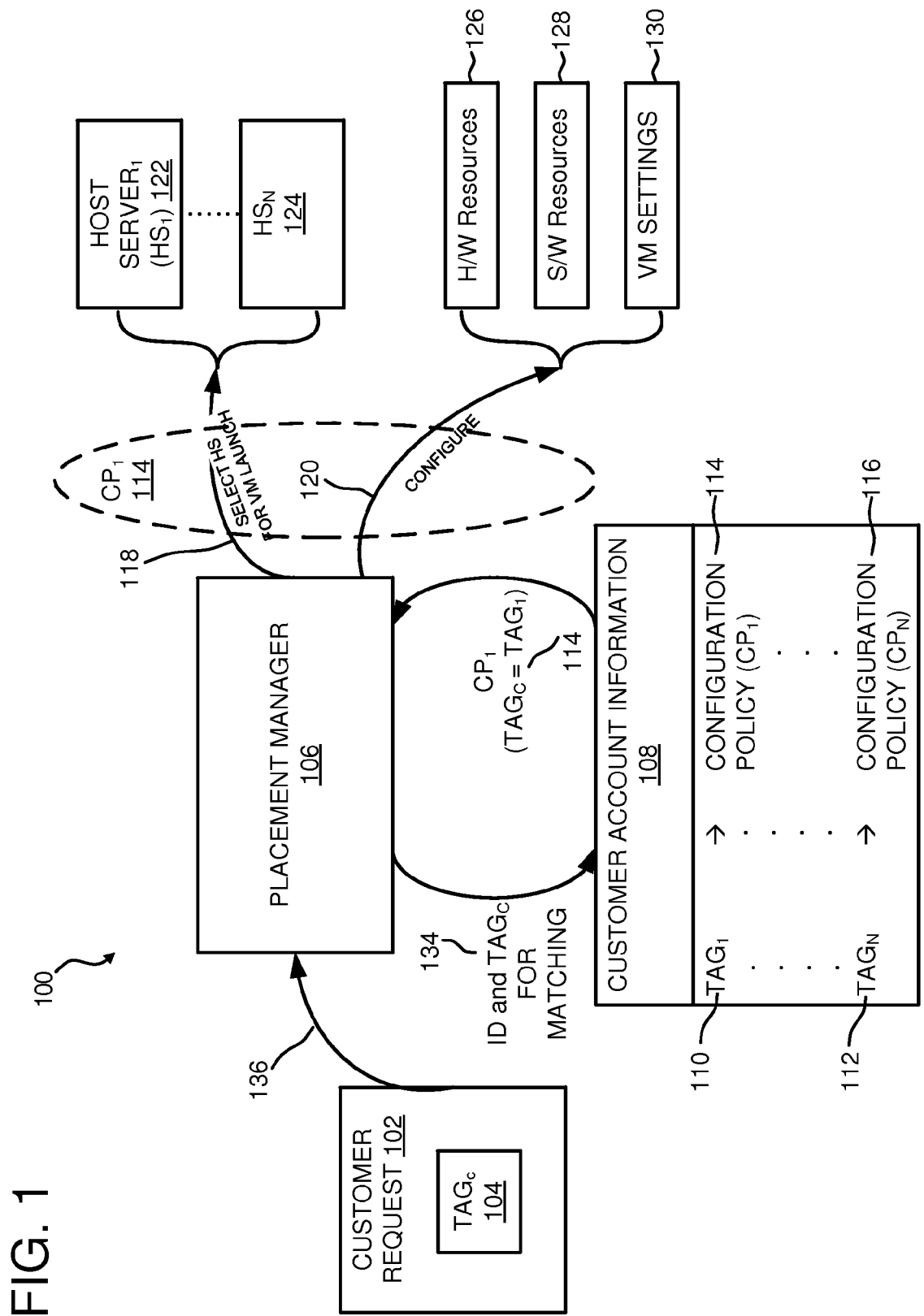
FIG. 1 is a diagram of an example environment supporting dynamic system configuration, in accordance with an embodiment of the disclosure.

FIG. 1 is a diagram of an example environment supporting dynamic system configuration, in accordance with an embodiment of the disclosure. Referring to FIG. 1, the example virtual multi-tenant environment 100 may comprise a placement manager 106 and a plurality of host server computers 122, . . . , 124. The host server computers 122, . . . , 124 can provide computing resources for executing software instances in the virtual multi-tenant environment 100 (illustrated in greater detail in FIGS. 5-7). The multi-tenant environment 100 may also comprise hardware resources 126 and software resources 128. The hardware resources 126 may include the hardware resources associated with the host server computers 122, ..., 124 (e.g., CPU, memory, disk storage, graphics card, network card, one or more sensors, modems, and so forth) as well as hardware resources used by one or more networks within the environment 100 (e.g., network attached storage, routers, switches, and so forth). The software resources 128 may include software running on the host servers 122, ..., 124 (e.g., hypervisors) or any other type of software associated with the hardware resources 126.

The placement manager 106 may comprise suitable circuitry, logic, and/or code and may be operable to determine where to place (launch) an instance based on one or more placement criteria or placement factors (as explained in greater detail below in reference to FIG. 5). For example, the placement manager 106 may be operable to determine where to place an instance based on computing capacity utilization and/or availability within the environment 100 (e.g., as received from the capacity tracker 616 in FIG. 6), one or more performance metrics associated with computing resources within the environment 100, and/or based on a configuration policy associated with a customer requesting the instance. For example, upon receiving a customer request 102 for launching an instance (e.g., via communication path 136), the placement manager 106 may initially select one of the servers 122, ..., 124 based on available capacity of the host servers and/or based on matching one or more desired performance characteristics specified by the customer (e.g., in the request 102) with one or more performance metrics measured in the multi-tenant environment 100 (as described in reference to FIG. 4).

Additionally, the placement manager 106 may use the configuration policy to dynamically configure settings associated with the hardware resources 126, the software resources 128, and/or virtual machine settings 130 associated with the virtual machine requested by the customer. The virtual machine (instance) settings 130 may comprise, for example, settings related to the virtual machine (instance) name, CPU features, location of the server hosting the instance metadata, location and name of the Ethernet (network communications) device used by the instance, and so forth.

In operation, a customer request 102 to launch a virtual machine within the multi-tenant environment 100 may be received by the placement manager 106. The customer request 102 may be associated with a configuration policy (with configuration parameters) for dynamic configuration of one or more resources within the environment 100, such as hardware resources 126 and software resources 128. In one instance, the configuration policy may be set by the customer at runtime (e.g., as part of an API request). In another instance, the configuration policy may be stored as part of the customer account information module 108 and may be accessed using customer identification information (e.g., 134). The customer account information 108 may be stored in a database (e.g., implemented with the placement manager 106 as part of a management server or may be implemented as a separate database in a network attached storage).

FIG. 1 illustrates the customer account information module 108 comprising configuration policies CP1 (114), ..., CPn (116) for the customer sending request 102. The configuration policies 114, ..., 116 may be associated with respective software tags TAG1 (110), ..., TAGn (112). In this regard, the customer request 102 may comprise a tag 104 (TAGc), which may be communicated to the placement manager 106 as part of an API request for launching an instance. The placement manager 106 may communicate customer identification information 134 and the received tag 104 to the customer account information module 108 for matching with the available tags 110, ..., 112. The customer account information module 108 may then match the received tag 104 with, for example, tag 110 stored by the customer account information module 108. The configuration policy 114, which corresponds to the tag 110, may then be communicated back to the placement manager 106. Even though the matching of the received tag 104 with the available customer tags 110, ..., 112 is illustrated in FIG. 1 as performed by the customer account information module 108, the present disclosure may not be limited in this regard and the matching may be performed by another module (e.g., by the placement manager 106).

The placement manager 106 may use the configuration policy 114 and/or computing resources availability information (e.g., as received from the capacity tracker 616 in FIG. 6) and/or based on one or more desired performance characteristics specified by the customer with one or more performance metrics measured in the multi-tenant environment 100 to initially select (e.g., at 118) one of the host servers 122, ..., 124 for launching the requested virtual machine. The placement manager 106 may further use the configuration policy 114 to configure (e.g., at 120) one or more of the hardware resources 126, software resources 128 and/or virtual machine settings 130. Thus, one or more parameters of hardware and/or software can be configured after receiving the launch request. The following are several non-limiting examples of settings that may be specified by a configuration policy for dynamic system configuration:

Example 1

The configuration policy may specify changes to a configuration file of a hypervisor for a selected host server computer (e.g., the hypervisor configuration file parameters may be passed to the hypervisor as part of a virtual machine launch request and as part of an API call, or may be passed by the placement manager 106 after the configuration policy is retrieved). Changes to the configuration file may include changes to the hypervisor scheduler (e.g., change scheduling of requests based on whether scheduling is to be biased towards latency-centered workloads or batch-centered workloads).

Example 2

Latency and/or throughput for the network used by the virtual machine.

Example 3

CPU specifics for the server computer hosting the virtual machine (e.g., whether or not CPU is pinned to a particular virtual machine; number of CPUs, CPU family or brand, CPU capacity and so forth).

Example 4

Capacity and speed (e.g., I/O Operations per Second) of network storage used by the virtual machine.

Example 5

Network card specifics for the server computer hosting the virtual machine (e.g., buffer size).

Example 6

Location of a subnet hosting the metadata server that will be used by the virtual machine (e.g., specify the metadata server subnet IP address).

Additional configuration information indicative of a desired behavior of the virtual machine in the multi-tenant environment 100 may also be included in the selected configuration policy 114 (or any of the remaining configuration policies associated with the requesting customer). The term "desired behavior" (as used herein) includes desired physical characteristics (e.g., temperature, power consumption, etc.) and settings (e.g., a specific value or within a discrete interval) of one or more hardware and/or software resources (initially prior to operation, during operation, and/or at rest), as well as any networks that communicatively couple the hardware resources.

The configuration policy (e.g., 114) may specify desired settings or properties of a specific virtual machine and/or any virtual machine that is to be launched in the multi-tenant environment 100. Furthermore, even though the configuration policy (e.g., 114) is retrieved by matching a tag (e.g., 104) received in a customer request 102 with tags 110, . . . , 112 in a customer account information module 108, the present disclosure is not limiting in this regard. More specifically, the customer account information module 108 may specify other types of configuration policies, as illustrated in FIG. 2.

Figure 2:
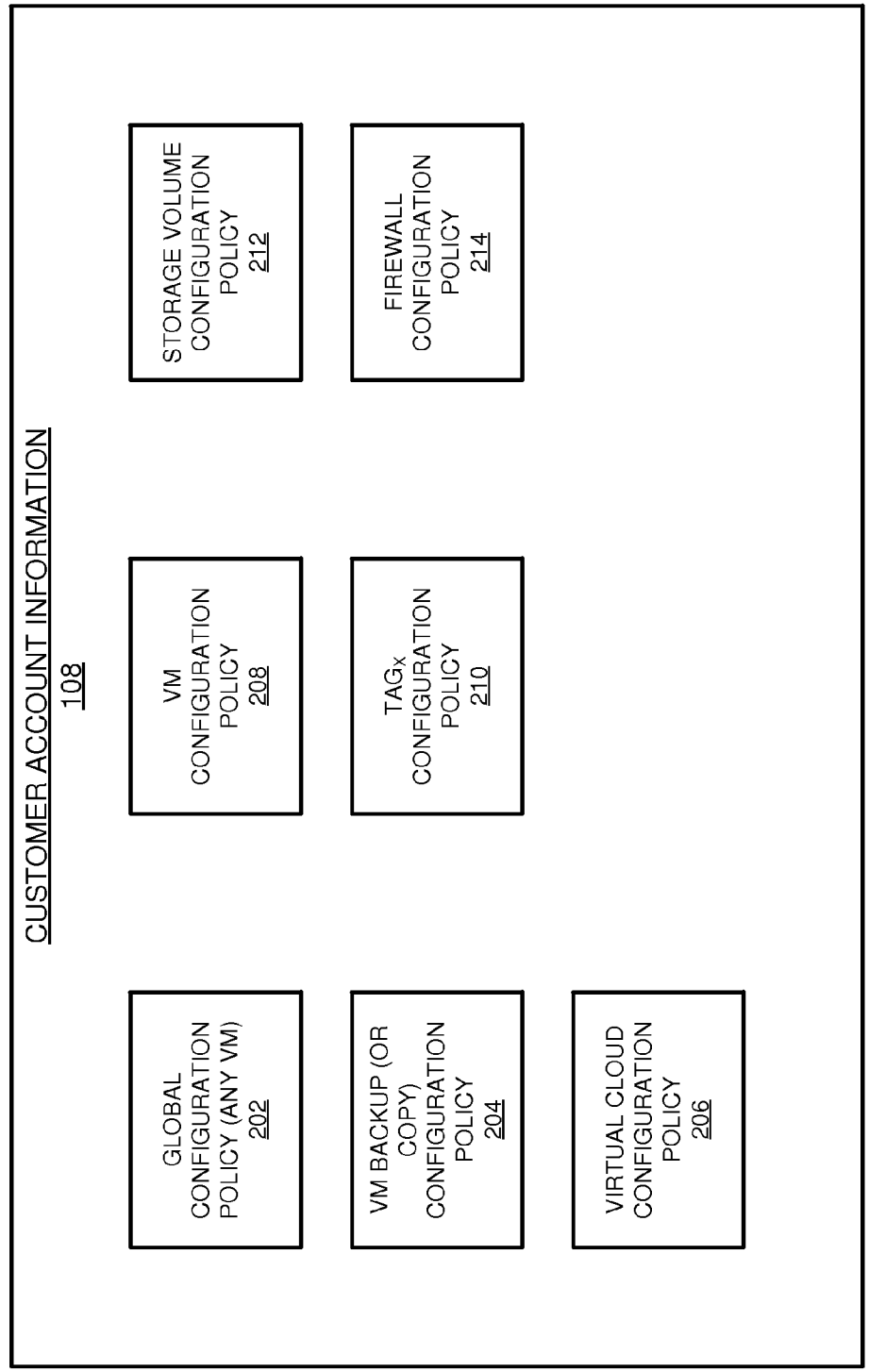
FIG. 2 is a diagram of example customer account information, which may be used during dynamic system configuration, in accordance with an embodiment of the disclosure.

FIG. 2 is a diagram of example customer account information, which may be used during dynamic system configuration, in accordance with an embodiment of the disclosure. Referring to FIG. 2, the customer account information module 108 may also comprise configuration policies 202, . . . , 214. The Tag configuration policy 210 is similar to the configuration policies 114, . . . , 116 associated with tags 110, . . . , 112. The global configuration policy 202 may specify configuration parameters that a customer desires to implement with regard to any virtual machine that is requested by the customer (e.g., a customer may request all virtual machines to use low-latency servers). Such global configuration policy may be used for a mass customization of the computing resources (and the virtual machines using them) within the multi-tenant environment 100.

Configuration policy 204 may specify parameters for configuring any backup of a virtual machine. Configuration policy 206 may specify parameters for configuring settings associated with a virtual network environment. Configuration policy 208 may specify parameters for configuring a specific type of a virtual machine. Such parameters may include RAM capacity, CPU, storage, latency, I/O characteristics (e.g., network I/O, disk I/O), memory bandwidth, and so forth. For example, configuration policy 208 may apply in instances when the customer has selected a preconfigured virtual machine but would still like to change hardware and/or software settings associated with the preconfigured virtual machine.

Configuration policy 212 may specify parameters for configuring a storage volume for use by any of the customer's virtual machines launched in the multi-tenant environment. Configuration policy 214 may specify parameters for configuring a firewall used by any of the customer's virtual machines launched in the multi-tenant environment.

The configuration policies illustrated in FIG. 2 constitute a non-exhaustive list of possible configuration policies, and other types of configuration policies may also be specified by the customer. Additionally, any of the configuration policies 202, . . . , 214 may be implemented/specified by the customer at virtual machine runtime (e.g., as part of an API request), or may be stored as part of the customer account information module 108 and accessed using customer identification information (e.g., 134).

Figure 3:
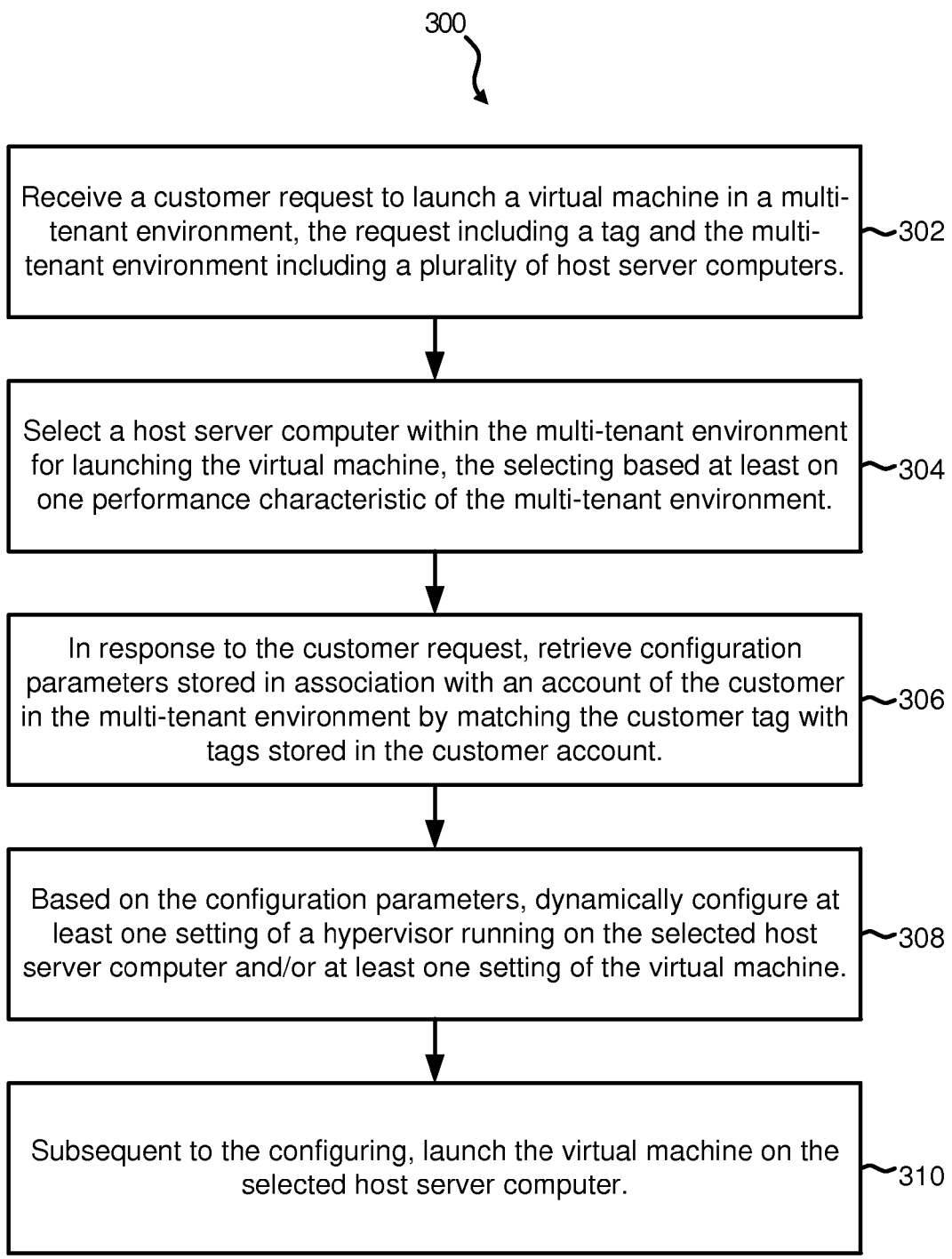
FIG. 3 is a flowchart of an example method supporting launching a virtual machine in a multi-tenant environment using dynamic configuration, in accordance with an embodiment of the disclosure.

FIG. 3 is a flowchart of an example method supporting launching a virtual machine in a multi-tenant environment using dynamic configuration, in accordance with an embodiment of the disclosure. Referring to FIGS. 1 and 3, the example method 300 may start at 302, when a customer request to launch a virtual machine is received in a multi-tenant environment. For example, the placement manager 106 in the multi-tenant environment 100 may receive the customer request 102, which may include a tag 104. The multi-tenant environment 100 may include a plurality of host server computers, such as host servers 122, . . . , 124.

At 304, a host server computer may be selected within the multi-tenant environment for launching the virtual machine, based at least on one performance characteristic of the multi-tenant environment. For example, the placement manager 106 may use computing resources availability information (e.g., as received from the capacity tracker 616 in FIG. 6) and/or matching of on one or more desired performance characteristics specified by the customer with one or more performance metrics measured in the multi-tenant environment 100 to initially select (e.g., at 118) one of the host servers 122, . . . , 124 for launching the requested virtual machine.

At 306, in response to the customer request, configuration parameters stored in association with an account of the customer may be retrieved in the multi-tenant environment by matching the customer tag with tags stored in the customer account. For example, the customer account information module 108 (or the placement manager 106) may match the received tag 104 with the available tags 110, . . . , 112 in the customer profile. The matched tag may be tag 110, indicating a configuration policy 114 for use by the placement manager 106.

At 308, based on the configuration parameters in the configuration policy 114, at least one setting of a hypervisor running on the selected host server computer and/or at least one setting of the virtual machine may be dynamically configured (e.g., dynamic configuration of the virtual machine settings 130 and/or the software resources 128). At 310, subsequent to the configuring, the virtual machine may be launched on the selected host server computer.

Figure 4:
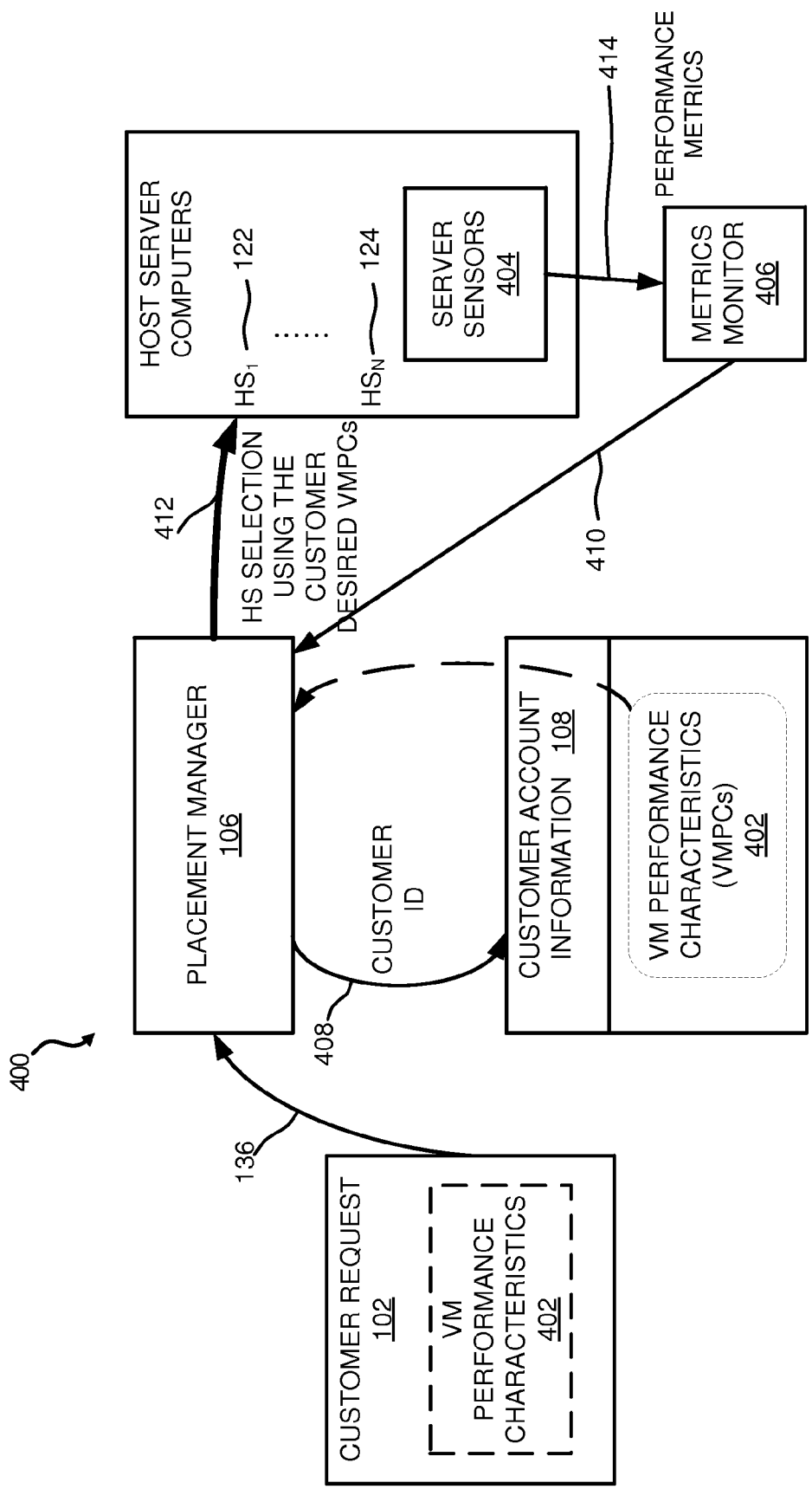
FIG. 4 is a diagram of an example environment supporting dynamic system configuration using performance metrics, in accordance with an embodiment of the disclosure.

FIG. 4 is a diagram of an example environment supporting dynamic system configuration using performance metrics, in accordance with an embodiment of the disclosure. Referring to FIG. 4, the example multi-tenant environment 400 is similar in many respects to the multi-tenant environment 100 in FIG. 1 (as indicated by the same element numbers used in FIGS. 1 and 4). The host server computers 122, . . . , 124 may utilize server sensors 404. More specifically, server sensors 404 may comprise suitable circuitry, logic, and/or code and may be located on one or more of the servers 122, . . . , 124 to collect various performance metrics 414. For example, each of the server sensors 404 may collect network traffic information, server CPU utilization, server disk and memory space utilization, server network throughput, server physical characteristics (e.g., server chassis temperature, average fan speed, air pressure, power usage, etc.), and so forth.

The multi-tenant environment 400 may further comprise a metrics monitor 406, which may comprise suitable circuitry, logic, and/or code and may be operable to collect the performance metrics 414 from the server sensors 404, and communicate the performance metrics 414 to the placement manager 106 via communication path 410. The metrics monitor 406 may also communicate (e.g., continuously or periodically at a pre-determined time interval) one or more alarm signals to the placement manager to indicate that one or more of the performance metrics 414 is outside of an acceptable value range (e.g., server disk capacity is near maximum or server chassis temperature is nearing a temperature threshold value, etc.) The placement manager 106 may then trigger a server switch and relocate one or more of the virtual machines running on the server associated with the alert to another server that has available capacity. Even though the metrics monitor 406 is illustrated as a separate module within the environment 400, the present disclosure may not be limited in this regard and the metrics monitor may be implemented as part of, for example, the placement monitor 106 or another device within the multi-tenant environment 400. In an example embodiment, the metrics monitor 406 (and/or the placement manager 106) may be operable to manage one or more settings globally, inside the server environment of host servers 122, . . . , 124. In this regard, the metrics monitor 406 (and/or the placement manager 106) may be operable to configure redundancy settings, power distribution, hotspot management, server load management, power consumption management, and other settings within the server environment.

In operation, the placement manager 106 may receive (e.g., via wired and/or wireless communication path 136) a customer request 102 for launching a virtual machine on one of the servers 122, . . . , 124. The customer request 102 may comprise virtual machine performance characteristics (VMPCs) 402. The VMPCs 402 may include desired characteristics for a new virtual machine, and/or desired modifications to one or more characteristics of a pre-configured virtual machine available for use in the multi-tenant environment 400. Example VMPCs include CPU speed, CPU family, I/O characteristics, number of CPUs, disk space, memory, network throughput, network latency, and so forth. In an example embodiment, the VMPCs 402 may be stored/maintained by the customer account information module 108, and may be accessed/retrieved by the placement manager by accessing the customer account information using customer identification information 408.

After the VMPCs 402 are received by the placement manager 106, one or more of the VMPCs 402 may be matched by the placement manager 106 with the performance metrics 414. In this regard, if there is a match with one of the servers 122, . . . , 124, the requested virtual machine may be initially launched on that server. For example, the VMPCs may specify a given processor speed, disk space, memory and network throughput. The virtual machine will be placed at the host server computer that optimally matches the requested VMPCs. In instances when the virtual machine is already placed at a server and an alarm is generated by the metrics monitor 406, the virtual machine may be moved to another server that matches the initially requested VMPCs and it does not trigger any alarms by the metrics monitor 406.

Figure 5:
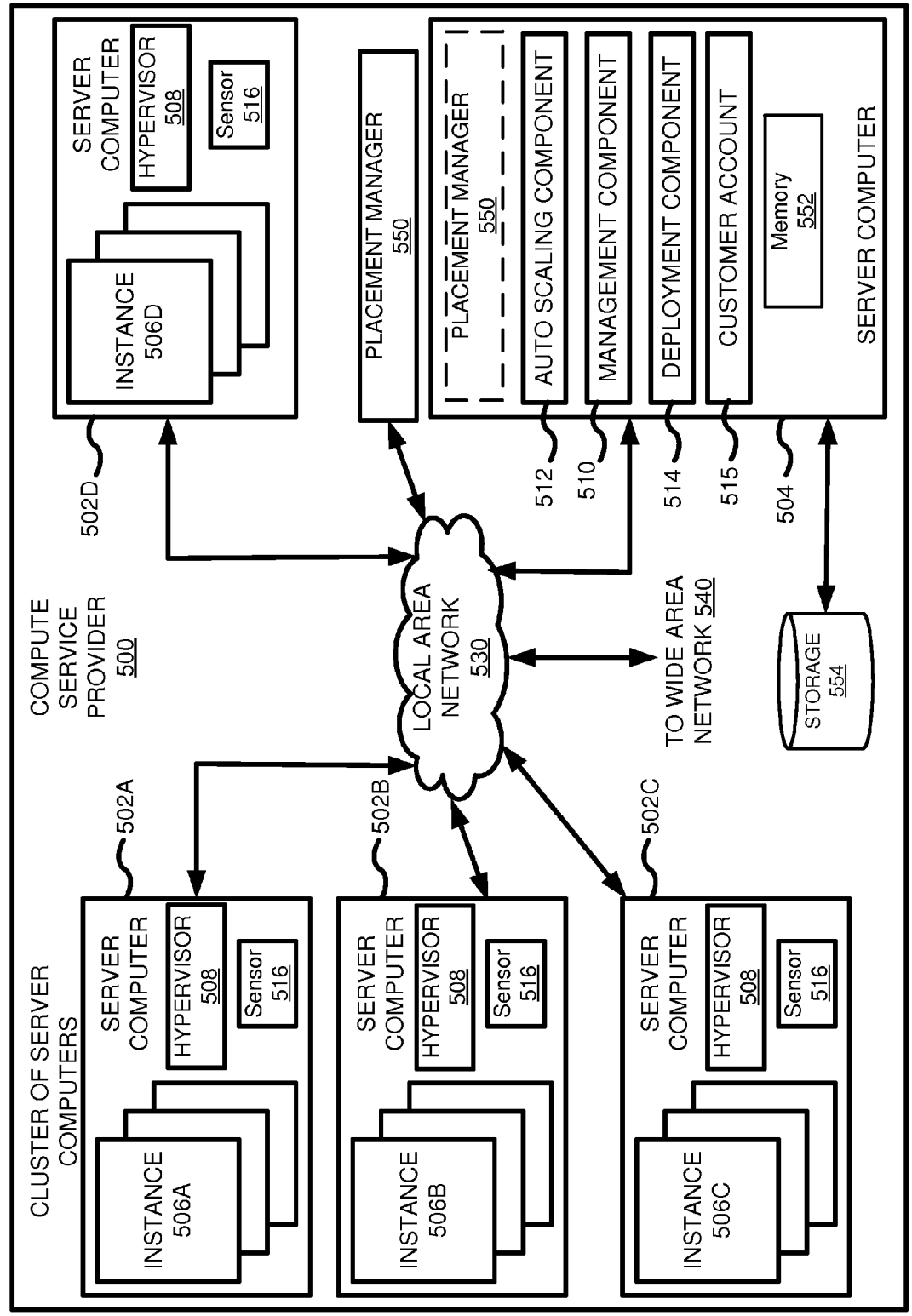
FIG. 5 is an example system diagram showing a plurality of virtual machine instances running in a multi-tenant environment, using a placement manager supporting dynamic system configuration, in accordance with an example embodiment of the disclosure.

FIG. 5 is an example system diagram showing a plurality of virtual machine instances running in a multi-tenant environment, using a placement manager supporting dynamic system configuration, in accordance with an example embodiment of the disclosure. More specifically, FIG. 5 is a computing system diagram of a network-based compute service provider 500 that illustrates one environment in which embodiments described herein can be used. By way of background, the compute service provider 500 (i.e., the cloud provider) is capable of delivery of computing and storage capacity as a service to a community of end recipients (e.g., tenants or customers).

In an example embodiment, the compute service provider 500 can be established for an organization by or on behalf of the organization. That is, the compute service provider 500 may offer a "private cloud environment." In another embodiment, the compute service provider 500 supports a multi-tenant environment, wherein a plurality of customers operate independently (i.e., a public cloud environment). Generally speaking, the compute service provider 500 can provide the following models: Infrastructure as a Service ("IaaS"), Platform as a Service ("PaaS"), and/or Software as a Service ("SaaS"). Other models can be provided. For the IaaS model, the compute service provider 500 can offer computers as physical or virtual machines and other resources. The virtual machines can be run as guests by a hypervisor, as described further below. The PaaS model delivers a computing platform that can include an operating system, programming language execution environment, database, and web server. Application developers can develop and run their software solutions on the compute service provider platform without the cost of buying and managing the underlying hardware and software. The SaaS model allows installation and operation of application software in the compute service provider. In some embodiments, end users access the compute service provider 500 using networked client devices, such as desktop computers, laptops, tablets, smartphones, etc. running web browsers or other lightweight client applications. Those skilled in the art will recognize that the compute service provider 500 can be described as a "cloud" environment.

The particular illustrated compute service provider 500 includes a plurality of server computers 502A-502D. While only four server computers are shown, any number can be used, and large centers can include thousands of server computers. The server computers 502A-502D can provide computing resources for executing software instances 506A-506D. In one embodiment, the instances 506A-506D are virtual machines. As known in the art, a virtual machine is an instance of a software implementation of a machine (i.e., a computer) that executes applications like a physical machine. In the example, each of the server computers 502A-502D can be configured to execute a hypervisor 508 or another type of program configured to enable the execution of multiple instances 506 on a single server. For example, each of the servers 502A-502D can be configured (e.g., via the hypervisor 508) to support one or more virtual machine partitions, with each virtual machine partition capable of running a virtual machine instance (e.g., server computer 502A could be configured to support three virtual machine partitions each running a corresponding virtual machine instance). Additionally, each of the instances 506 can be configured to execute one or more applications.

In an example embodiment, each of the server computers 502A-502D may also comprise a sensor 516 communicatively coupled to the network 530. The sensor 516 may comprise suitable circuitry, logic, and/or code and may be operable to collect various performance metrics (e.g., performance metrics 414 in FIG. 4). For example, each of the server sensors 516 may collect network traffic information, server CPU utilization, server disk and memory space utilization, server network throughput, server physical characteristics (e.g., server chassis temperature, average fan speed, power usage, etc.), and so forth.

The compute service provider 500 may also comprise a placement manager 550. The placement manager 550 may comprise suitable circuitry, logic, and/or code and may be operable to determine which partition in which host server computer can be used to place (launch) an instance based on one or more placement criteria or placement factors. For example, the placement manager 550 may initially determine whether placing an instance in a given server computer is permitted based on operating system (OS) used by the instance (e.g., minimize number of servers using certain operating system so as to minimize licensing costs), architecture, networking support, business requirements, and so forth.

If placing the instance is permitted and is not violating any of the above mentioned factors, the placement manager 550 may determine an optimal partition in a server computer for launching the instance based on a variety of factors, such as density, launch concurrency, instance caching, and service availability.

Density may be associated with how densely occupied with instances a given server is. Density optimization may be performed on a sliding scale since high density improves optimization but low density may reduce the effect of failures and improves the performance of instances. Launch concurrency may be associated with the placement manager 550 avoiding hotspot creation by not launching instances at the same place at the same time. Instance caching may be associated with launching pre-configured instances (which may have to be stored in a cache) at a server computer and a partition near the cache that stores the pre-configured instance. Service availability may be associated with the placement manager 550 trying to spread instances from a single customer across single points of failure (which reduces the impact per customer of hardware failure). In this regard, instances may be spread not only across partitions but also switches (see e.g. FIG. 7).

The placement manager 550 may be operable to determine where to place an instance based on the above factors and/or based on computing capacity utilization/availability within the environment of the compute service provider 500 (e.g., as received from the capacity tracker 616 in FIG. 6), one or more performance metrics associated with computing resources within the environment of the compute service provider 500, and/or based on a configuration policy associated with a customer requesting the instance (as explained herein above).

Figure 6:
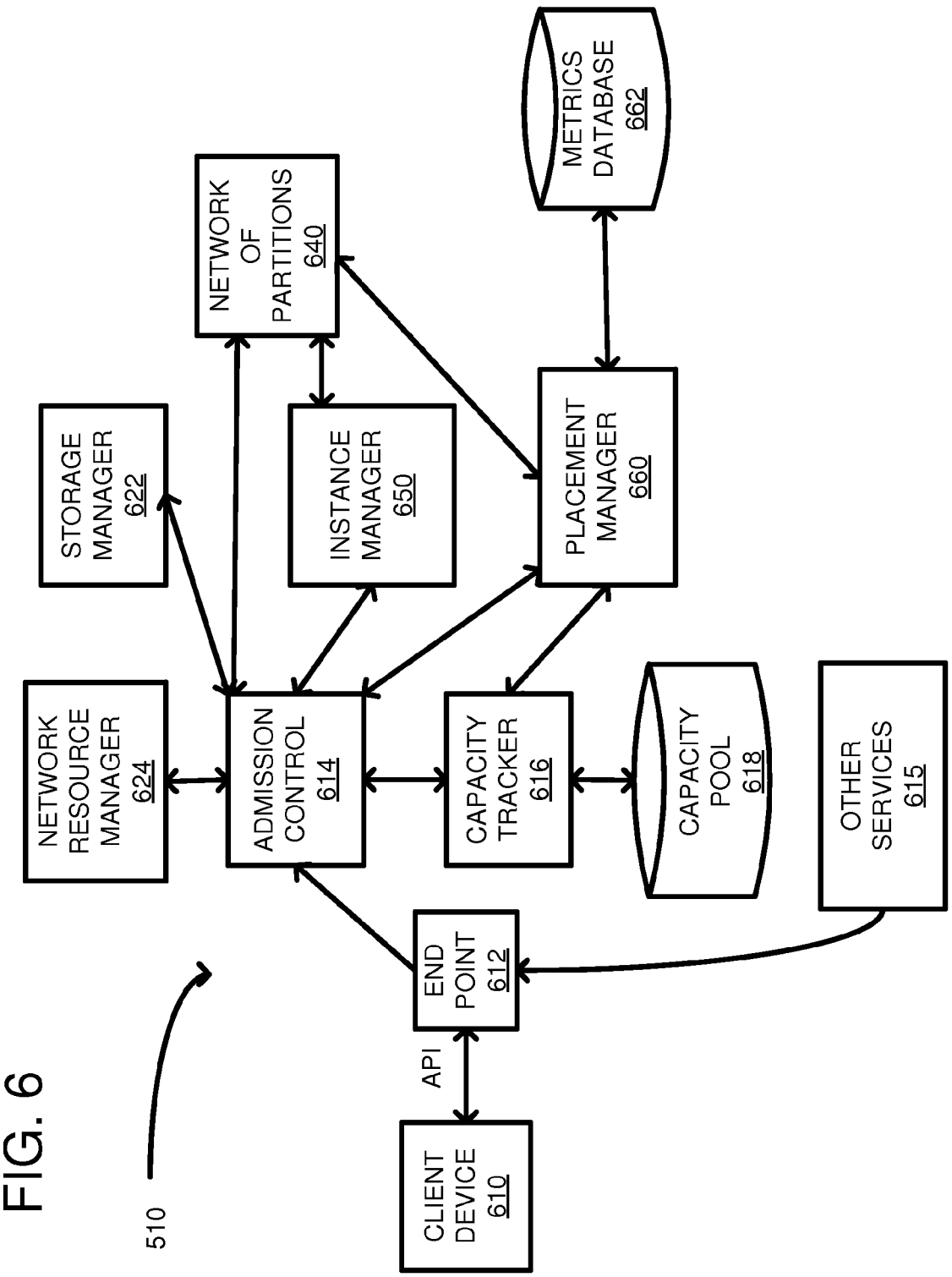
FIG. 6 shows further details of an example system including a plurality of management components associated with a control plane, which may be used to manage dynamic system configuration according to one embodiment.

The placement manager 550 may be implemented in a dedicated server (similar to the servers 502A-502D), or may be implemented as part of the server computer 504 that performs management functions. For example, the placement manager 550 may be implemented as part of the management component 510 (as seen in FIG. 6).

It should be appreciated that although the embodiments disclosed herein are described primarily in the context of virtual machines, other types of instances can be utilized with the concepts and technologies disclosed herein. For instance, the technologies disclosed herein can be utilized with storage resources, data communications resources, and with other types of computing resources. The embodiments disclosed herein might also execute all or a portion of an application directly on a computer system without utilizing virtual machine instances.

One or more server computers 504 can be reserved for executing software components for managing the operation of the server computers 502, the instances 506, the hypervisors 508, and/or the sensors 516. For example, the server computer 504 can execute a management component 510. A customer can access the management component 510 to configure various aspects of the operation of the instances 506 purchased by the customer. For example, the customer can purchase, rent or lease instances and make changes to the configuration of the instances. The customer can also specify settings regarding how the purchased instances are to be scaled in response to demand. The management component 510 can further include a policy document to implement customer policies (e.g., configuration policies as discussed in reference to FIG. 1).

The server computer 504 may further comprise memory 552 and storage 554. The memory 552 may be used as processing memory by one or more of the placement manager 550 and/or the components 510, . . . , 515. The storage 554 may include one or more databases for storing and maintaining customer account information (e.g., one or more configuration policies and/or VMPCs as described in reference to FIGS. 1 and 4, respectively). The storage 554 may include the customer account information module 108, and may be implemented as part of the placement manager 550 and/or any of the other components of the server computer 504 (e.g., as part of the management component 510).

An auto scaling component 512 can scale the instances 506 based upon rules defined by the customer. In one embodiment, the auto scaling component 512 allows a customer to specify scale-up rules for use in determining when new instances should be instantiated and scale-down rules for use in determining when existing instances should be terminated. The auto scaling component 512 can consist of a number of subcomponents executing on different server computers 502 or other computing devices. The auto scaling component 512 can monitor available computing resources over an internal management network and modify resources available based on need.

A deployment component 514 can be used to assist customers in the deployment of new instances 506 of computing resources. The deployment component can have access to account information associated with the instances, such as who is the owner of the account, credit card information, country of the owner, etc. The deployment component 514 can receive a configuration from a customer that includes data describing how new instances 506 should be configured. For example, the configuration can specify one or more applications to be installed in new instances 506, provide scripts and/or other types of code to be executed for configuring new instances 506, provide cache logic specifying how an application cache should be prepared, and other types of information. The deployment component 514 can utilize the customer-provided configuration and cache logic to configure, prime, and launch new instances 506. The configuration, cache logic, and other information may be specified by a customer using the management component 510 or by providing this information directly to the deployment component 514. The instance manager can be considered part of the deployment component.

Customer account information 515 can include any desired information associated with a customer of the multi-tenant environment. For example, the customer account information can include a unique identifier for a customer, a customer address, billing information, licensing information, customization parameters for launching instances, scheduling information, auto-scaling parameters, previous IP addresses used to access the account, and so forth.

A network 530 can be utilized to interconnect the server computers 502A-502D and the server computer 504. The network 530 can be a local area network (LAN) and can be connected to a Wide Area Network (WAN) 540 so that end-users can access the compute service provider 500. It should be appreciated that the network topology illustrated in FIG. 5 has been simplified and that many more networks and networking devices can be utilized to interconnect the various computing systems disclosed herein.

FIG. 6 shows further details of an example system including a plurality of management components associated with a control plane, which may be used to manage dynamic system configuration according to one embodiment. More specifically, FIG. 6 illustrates in further detail management component 510, which may implement the placement manager 550 within the multi-tenant environment of the compute service provider 500.

In order to access and utilize instances (such as instances 506 of FIG. 5), a client device can be used. The client device 610 can be any of a variety of computing devices, mobile or otherwise, including a cell phone, smartphone, handheld computer, Personal Digital Assistant (PDA), desktop computer, etc. The client device 610 can communicate with the compute service provider 500 through an end point 612, which can be a DNS address designed to receive and process application programming interface (API) requests. In particular, the end point 612 can be a web server configured to expose an API. Using the API requests, a client device 610 can make requests to implement any of the functionality described herein. Other services 615, which can be internal to the compute service provider 500, can likewise make API requests to the end point 612. For example, the client device 610 may use the API requests to communicate a customer request and a tag (as explained in reference to FIG. 1) for launching an instance.

Other general management services that may or may not be included in the compute service provider 500 (and/or within the management component 510) include an admission control 614, e.g., one or more computers operating together as an admission control web service. The admission control 614 can authenticate, validate and unpack the API requests for service or storage of data within the compute service provider 500. The capacity tracker 616 is responsible for determining how the servers need to be configured in order to meet the need for the different instance types by managing and configuring physical inventory in terms of forecasting, provisioning, and real-time configuration and allocation of capacity. The capacity tracker 616 maintains a pool of available inventory in a capacity pool database 618. The capacity tracker 616 can also monitor capacity levels so as to know whether resources are readily available or limited.

An instance manager 650 controls launching and termination of instances in the network. When an instruction is received (such as through an API request) to launch an instance, the instance manager 650 pulls resources from the capacity pool 618 and launches the instance on a decided upon host server computer. Similar to the instance manager are the storage manager 622 and the network resource manager 624. The storage manager 622 relates to initiation and termination of storage volumes, while the network resource manager 624 relates to initiation and termination of routers, switches, subnets, etc. A network of partitions 640 is described further in relation to FIG. 7 and includes a physical layer upon which the instances are launched.

A placement manager 660 may comprise suitable circuitry, logic, and/or code and may have the same functionality as described above in reference to the placement managers 550 and 106. Additionally, the placement manager 660 may implement a health monitoring service (e.g., such as the metrics monitor 406) that provides monitoring for resources (e.g., performance metrics such as 414) and the applications customers run on the compute service provider 500. System administrators can also use the monitoring service of the placement manager 660 to collect and track metrics (e.g., 414) and gain insight to how applications and server computers are running. For example, the monitoring service of the placement manager 660 can allow system-wide visibility into application performance and operational health. Metrics generated by the health monitoring service of the placement manager 660 can be stored in the metrics database 662.

The placement manager 660 may also communicate with the capacity tracker 616 to receive information regarding available partitions and/or host servers that can be used for launching an instance. Additionally, communications with the admission control 614 may be used to launch an instance, and communications with the network of partitions 640 may be used to push configuration changes (e.g., from a configuration policy) onto hardware and/or software resources of the host servers in order to effectuate functionalities described herein.

Figure 7:
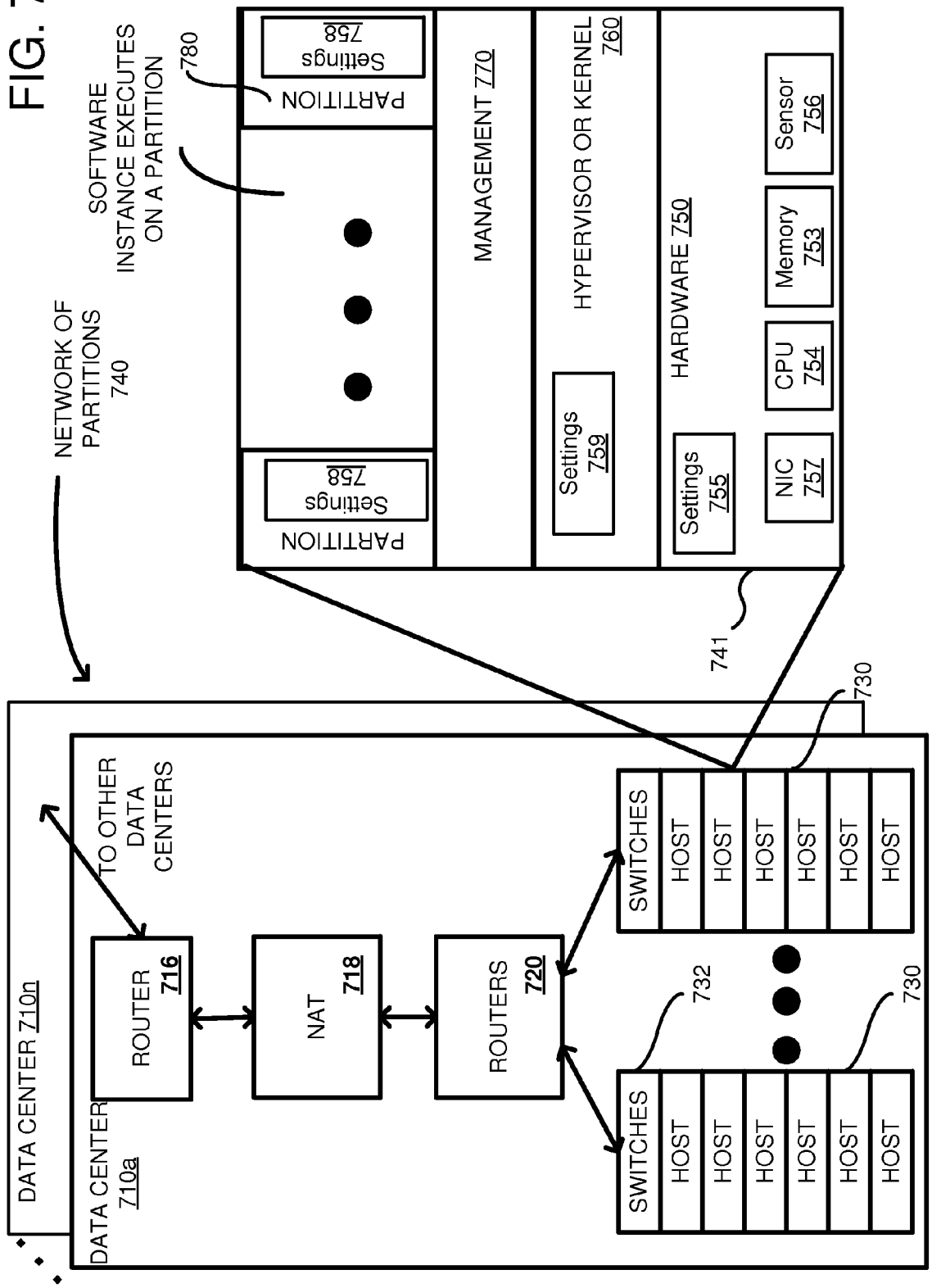
FIG. 7 shows an example of a plurality of host computers, routers, and switches—which are hardware assets used for running virtual machine instances—with the host computers having settings that may be configured according to one embodiment.

FIG. 7 shows an example of a plurality of host computers, routers, and switches—which are hardware assets used for running virtual machine instances—with the host computers having settings that may be configured according to one embodiment. More specifically, FIG. 7 illustrates the network of partitions 740 and the physical hardware associated therewith. The network of partitions 740 can include a plurality of data centers, such as data centers 710a, . . . , 710n, coupled together by routers, such as router 716.

The router 716 reads address information in a received packet and determines the packet's destination. If the router decides that a different data center contains a host server computer, then the packet is forwarded to that data center. If the packet is addressed to a host in the data center 710a, then it is passed to a network address translator (NAT) 718 that converts the packet's public IP address to a private IP address. The NAT 718 also translates private addresses to public addresses that are bound outside of the data center 710a. Additional routers 720 can be coupled to the NAT 718 to route packets to one or more racks 730 of host server computers. Each rack 730 can include a switch 732 coupled to multiple host server computers. A particular host server computer is shown in an expanded view at 741.

Each host 741 has underlying hardware 750 including a network interface card (NIC) 757, one or more CPUs (e.g., processor 754), memory (e.g., memory 753), a sensor 756 (e.g., such as a server sensor 404), storage devices (not illustrated), etc. The hardware layer 750 may implement hardware settings 755.

Running a layer above the hardware 750 is a hypervisor or kernel layer 760. The hypervisor or kernel layer 760 can be classified as a type 1 or type 2 hypervisor. A type 1 hypervisor runs directly on the host hardware 750 to control the hardware and to manage the guest operating systems. A type 2 hypervisor runs within a conventional operating system environment. Thus, in a type 2 environment, the hypervisor can be a distinct layer running above the operating system and the operating system interacts with the system hardware. Different types of hypervisors include Xen-based, Hyper-V, ESXi/ESX, Linux, etc., but other hypervisors can also be used. The hypervisor or kernel layer 760 may comprise software settings 759 (e.g., settings associated with a configuration file used by the hypervisor).

A management layer 770 can be part of the hypervisor or separated therefrom and generally includes device drivers needed for accessing the hardware 750. The partitions 780 are logical units of isolation by the hypervisor. Each partition 780 can be allocated its own portion of the hardware layer's memory, CPU allocation, storage, etc. Additionally, each partition can include a virtual machine, its own guest operating system, and its own settings 758. As such, each partition 780 is an abstract portion of capacity designed to support its own virtual machine independent of the other partitions.

In accordance with an example embodiment of the disclosure, a placement manager (e.g., 660) may be used to implement dynamic configuration functionalities as described herein and to configure one or more of the settings 755, 758, 759, and/or other hardware, software, or virtual machine settings. Any applications executing on the instances can be monitored using the management layer 770, which can then pass the metrics to a health monitoring service (e.g., of a placement manager such as 660) for storage in a metrics database. Additionally, the management layer 770 can pass to the performance manager (e.g., 660) the number of instances that are running, when they were launched, the operating system being used, the applications being run, etc. All such metrics can be used by the health monitoring service and stored in a database for subsequent use.

Figure 8:
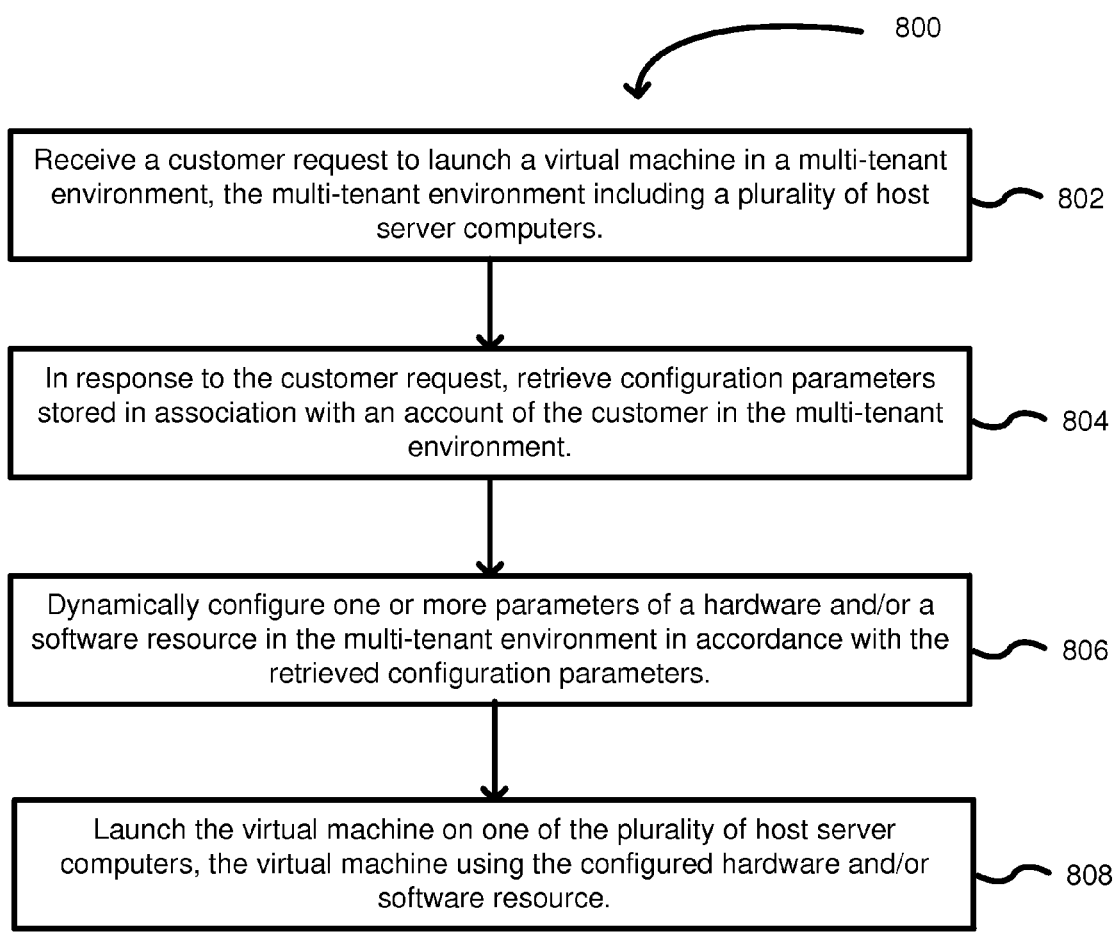
FIG. 8 is a flowchart of another example method supporting launching a virtual machine in a multi-tenant environment using dynamic configuration, in accordance with an embodiment of the disclosure.

FIG. 8 is a flowchart of another example method supporting launching a virtual machine in a multi-tenant environment using dynamic configuration, in accordance with an embodiment of the disclosure. Referring to FIGS. 1, 4, and 8, the example method 800 may start at 802, when a customer request to launch a virtual machine may be received in a multi-tenant environment, the multi-tenant environment including a plurality of host server computers. For example, the placement manager 106 may receive a customer request 102 for launching a virtual machine on one of the servers 122, . . . , 124.

At 804, in response to the customer request, configuration parameters stored in association with an account of the customer may be retrieved in the multi-tenant environment. For example, the placement manager 106 may retrieve a configuration policy (e.g., one of 114, . . . , 116) and/or VMPCs 402 associated with customer account information. At 806, one or more parameters of a hardware and/or a software resource in the multi-tenant environment may be dynamically configured in accordance with the retrieved configuration parameters. For example, the placement manager 106 may dynamically configure (based on the retrieved configuration policy and/or VMPCs 402) hardware resources 126, software resources 128, and/or virtual machine settings 130. At 808, the placement manager 106 may launch (or cause launching of) the virtual machine on one of the plurality of host server computers (e.g., 122, . . . , 124), the virtual machine using the configured hardware and/or software resource.

The configuration parameters disclosed herein may be associated with at least one desired performance characteristic (e.g., the VMPCs 402) of the virtual machine to be launched. The placement manager 106 may receive performance metrics (e.g., 414) associated with one or more of the host server computers (e.g., 122, . . . , 124) currently running in the multi-tenant environment 400. The placement manager 106 (and/or the customer account information module 108) may match at least one of the received performance metrics (e.g., 414) to the desired performance characteristic (e.g., VMPCs 402). The placement manager 106 may then select the host server computer upon which to launch the virtual machine using the matched performance metrics. In some instances, the performance metrics 414 may dynamically change in accordance with use of the hardware resources (e.g., 126 in FIG. 1, including the host servers 122, . . . , 124) in the multi-tenant environment (e.g., 100 and/or 400).

Additionally, the placement manager 106 may also use the configuration parameters (e.g., from one of the configuration policies 114, . . . , 116) to change properties of the virtual machine (as explained in reference to FIG. 1). The received customer request (e.g., 102) may be an API including a tag (e.g., 104) used to retrieve the configuration parameters (e.g., 114, . . . , 116) from the customer account (e.g., 108).

Figure 9:
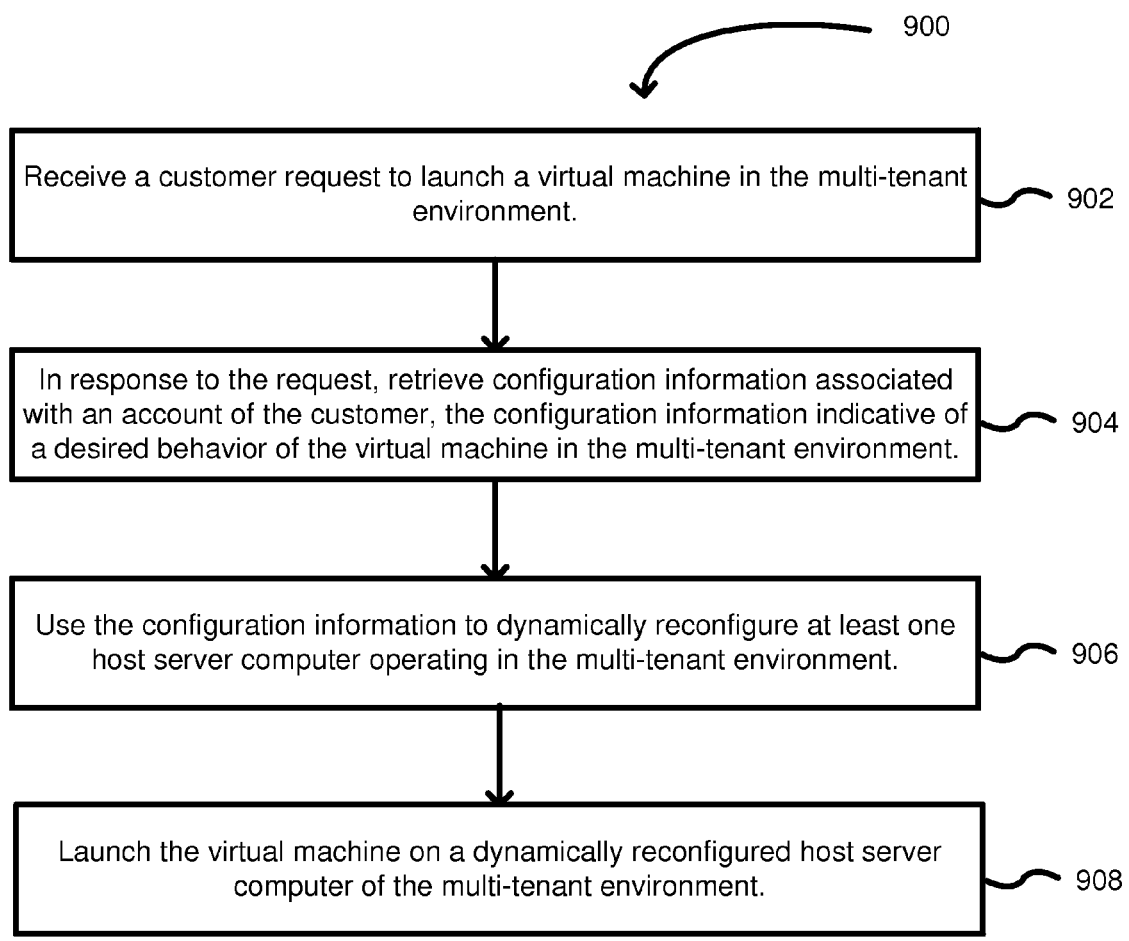
FIG. 9 is a flowchart of yet another example method supporting launching a virtual machine in a multi-tenant environment using dynamic configuration, in accordance with an embodiment of the disclosure.

FIG. 9 is a flowchart of yet another example method supporting launching a virtual machine in a multi-tenant environment using dynamic configuration, in accordance with an embodiment of the disclosure. Referring to FIGS. 1, 2, 4, and 9, the example method 900 may start at 902 when a customer request to launch a virtual machine may be received in a multi-tenant environment, the multi-tenant environment including a plurality of host server computers. For example, the placement manager 106 may receive a customer request 102 for launching a virtual machine on one of the servers 122, . . . , 124.

At 904, in response to the request, configuration information associated with an account of the customer may be retrieved. The configuration information may be indicative of a desired behavior of the virtual machine in the multi-tenant environment. For example, the placement manager 106 may retrieve a configuration policy (e.g., one of 114, . . . , 116 or 202, . . . , 214) and/or VMPCs 402 associated with customer account information. At 906, the placement manager 906 may use the retrieved configuration information to dynamically reconfigure at least one of the host server computers (e.g., 122, . . . , 124) in the multi-tenant environment. Additionally, the placement manager 106 may dynamically configure (and reconfigure) (based on the retrieved configuration policy and/or VMPCs 402) hardware resources 126, software resources 128, and/or virtual machine settings 130 (the virtual machine settings may comprise settings of the host server the virtual machine is launched on). At 908, the placement manager 106 may launch (or cause launching of) the virtual machine on a dynamically reconfigured host server computer of the multi-tenant environment.

The dynamically reconfiguring may include changing parameters on a hardware and/or a software resource (e.g., 126, 128) in the multi-tenant environment (e.g., 100) that interacts with the virtual machine. The dynamically reconfiguring may also include customizing parameters (e.g., 130) of the virtual machine that is launched. Customizing of the parameters of the virtual machine may include modifying a configuration file used by a hypervisor (e.g., 508 in FIG. 5) of a host server computer (e.g., 502A-502D) to launch the virtual machine on the host server computer, the modifying being based on the retrieved configuration information. Customizing of the parameters of the virtual machine may also include setting up an IP address for a metadata server used by the virtual machine.

The configuration information may include a plurality of tags (110, . . . , 112) with different customized configurations (e.g., 114, . . . , 116) of the virtual machine associated with each tag. The dynamically reconfiguring may include configuring a host server computer (e.g., 502A-502D) used for launching the virtual machine within the multi-tenant environment, configuring a network storage server computer (e.g., 554) associated with the virtual machine, and configuring at least one network parameter for one or more communication networks (e.g., 530, 540) within the multi-tenant environment.

Figure 10:
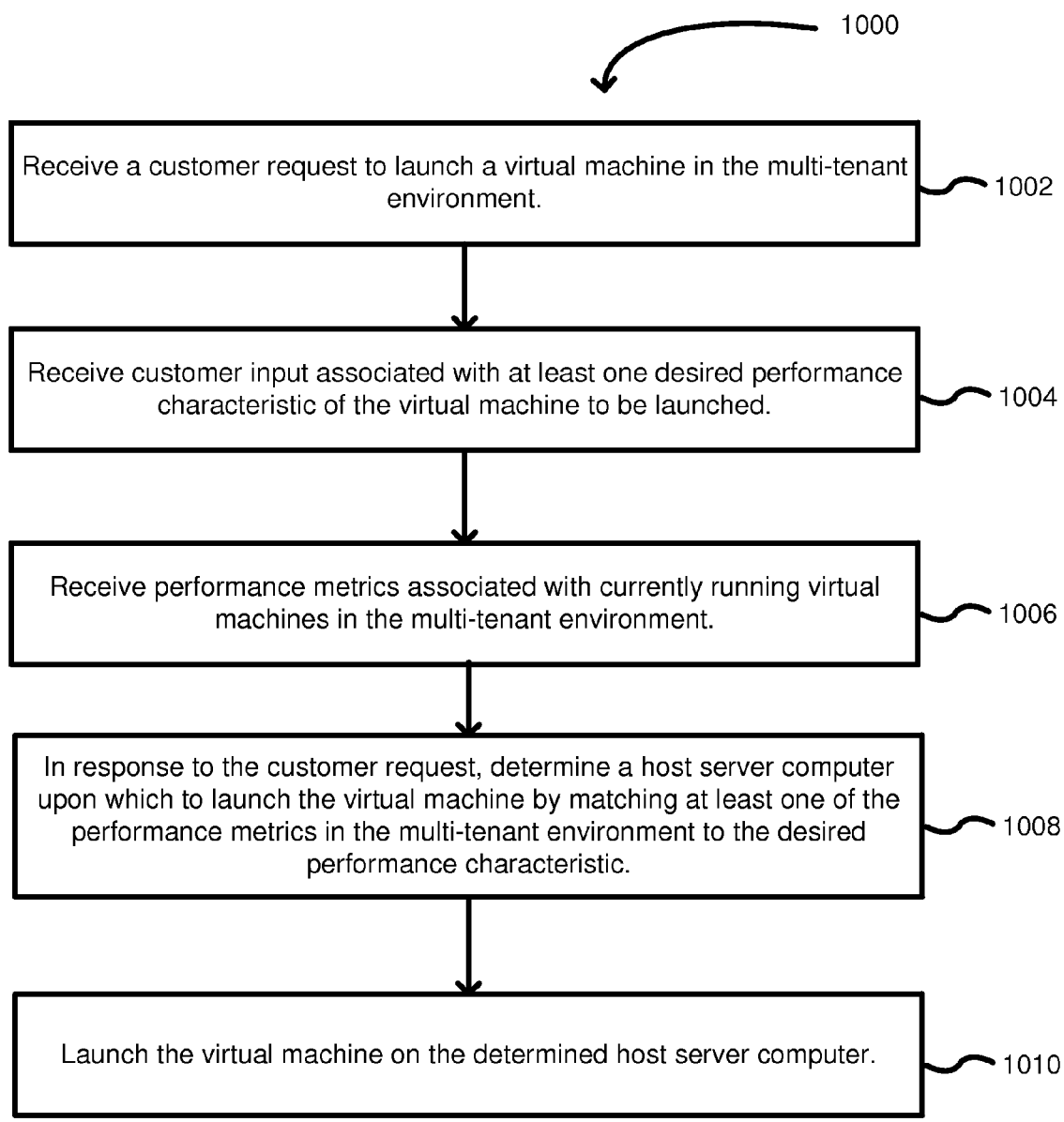
FIG. 10 is a flowchart of yet another example method supporting launching a virtual machine in a multi-tenant environment using dynamic configuration, in accordance with an embodiment of the disclosure.

FIG. 10 is a flowchart of yet another example method supporting launching a virtual machine in a multi-tenant environment using dynamic configuration, in accordance with an embodiment of the disclosure. Referring to FIGS. 1, 2, 4 and 10, the example method 1000 may start at 1002, when a customer request to launch a virtual machine may be received in a multi-tenant environment, the multi-tenant environment including a plurality of host server computers. For example, the placement manager 106 may receive a customer request 102 for launching a virtual machine on one of the servers 122, . . . , 124.

At 1004, a customer input may be received, which input may be associated with at least one desired performance characteristic of the virtual machine to be launched. For example, the customer request 102 may include desired performance characteristics (e.g., VMPCs 402). Alternatively, the VMPCs may be retrieved by the placement manager 106 from a customer account information database (e.g., 554 in FIG. 5). At 1006, the placement manager may receive performance metrics (e.g., 414) associated with currently running virtual machines in the multi-tenant environment. At 1008, the placement manager 106 may determine, in response to the customer request 102, a host server computer (from the host server computers 122, . . . , 124) upon which to launch the virtual machine. The determining may be performed by matching at least one of the performance metrics (e.g., 414) in the multi-tenant environment to the desired performance characteristic (e.g., the VMPCs 402). At 1010, the placement manager 106 may launch (or cause launching of) the virtual machine on the determined host server computer.

The determining of the host server computer may further include analyzing performance metrics not associated with the desired performance characteristics of the virtual machine. For example, determining which host server computer to use for launching an instance may be based on analysis of performance metrics 414 that are not associated with the desired VMPCs 402 (e.g., placement may be based on temperature characteristics of server chassis, power consumption, etc.). The performance metrics 414 may dynamically change in accordance with use of hardware resources in the multi-tenant environment. The performance metrics 414 may be associated with one or more of the following: latency of the currently running virtual machines, CPU usage of the currently running virtual machines, network bandwidth, disk input/output associated with the currently running virtual machines, network throughput, and/or power consumption.

The placement manager 106 may be operable to detect that the launched virtual machine is no longer matching one or more of the desired performance characteristics (e.g., VMPCs 402). In response to such detection, the virtual machine may be migrated to another host server computer that matches the desired performance characteristic.

In some instances, the customer ID (408 or 134) may include a customer account number (received from the customer) to obtain a policy document (e.g., 114, . . . , 116), which includes at least one of the desired performance characteristic (VMPCs 402). The policy document may further include configuration parameters for one or both of hardware resources and software resources within the multi-tenant environment. The multi-tenant environment (e.g., 100 and/or 400) may include a plurality of pre-configured virtual machine types, and the customer request to launch a virtual machine may include a customized virtual machine type that is not one of the pre-configured virtual machine types.

Figure 11:
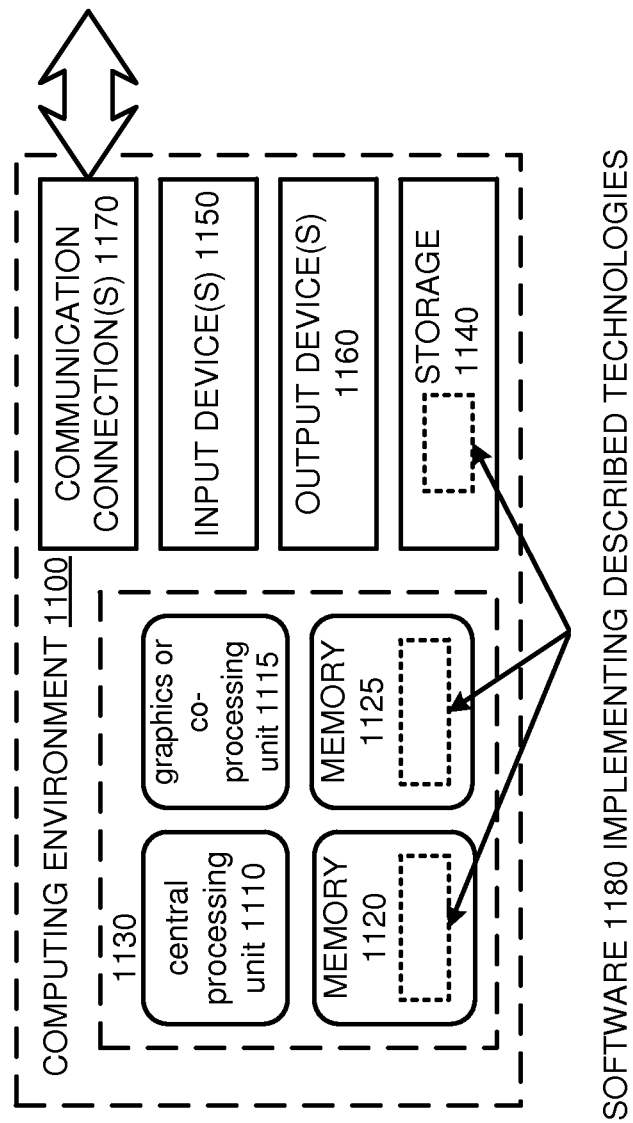
FIG. 11 depicts a generalized example of a suitable computing environment in which the described innovations may be implemented.

FIG. 11 depicts a generalized example of a suitable computing environment in which the described innovations may be implemented. Referring to FIG. 11, the computing environment 1100 is not intended to suggest any limitation as to scope of use or functionality, as the innovations may be implemented in diverse general-purpose or special-purpose computing systems. For example, the computing environment 1100 can be any of a variety of computing devices (e.g., desktop computer, laptop computer, server computer, tablet computer, etc.)

With reference to FIG. 11, the computing environment 1100 includes one or more processing units 1110, 1115 and memory 1120, 1125. In FIG. 11, this basic configuration 1130 is included within a dashed line. The processing units 1110, 1115 execute computer-executable instructions. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 11 shows a central processing unit 1110 as well as a graphics processing unit or co-processing unit 1115. The tangible memory 1120, 1125 may be volatile memory (e.g., registers, cache, RAM), non-volatile memory (e.g., ROM, EEPROM, flash memory, etc.), or some combination of the two, accessible by the processing unit(s). The memory 1120, 1125 stores software 1180 implementing one or more innovations (e.g., functionalities) described herein, in the form of computer-executable instructions suitable for execution by the processing unit(s).

A computing system may have additional features. For example, the computing environment 1100 includes storage 1140, one or more input devices 1150, one or more output devices 1160, and one or more communication connections 1170. An interconnection mechanism (not shown) such as a bus, controller, or network interconnects the components of the computing environment 1100. Typically, operating system software (not shown) provides an operating environment for other software executing in the computing environment 1100, and coordinates activities of the components of the computing environment 1100.

The tangible storage 1140 may be removable or non-removable, and includes magnetic disks, magnetic tapes or cassettes, CD-ROMs, DVDs, or any other medium which can be used to store information in a non-transitory way and which can be accessed within the computing environment 1100. The storage 1140 stores instructions for the software 1180 implementing one or more innovations described herein.

The input device(s) 1150 may be a touch input device such as a keyboard, mouse, pen, or trackball, a voice input device, a scanning device, or another device that provides input to the computing environment 1100. The output device(s) 1160 may be a display, printer, speaker, CD-writer, or another device that provides output from the computing environment 1100.

The communication connection(s) 1170 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub-combinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. Therefore, what is claimed as the invention is all that comes within the scope of these claims.

What is claimed is:

1. A method of launching a virtual machine in a multi-tenant environment using dynamic configuration, comprising:
   receiving a customer request to launch a virtual machine in the multi-tenant environment, the multi-tenant environment including a plurality of host server computers;
   in response to the customer request, retrieving configuration parameters stored in association with an account of the customer in the multi-tenant environment by matching at least a portion of the customer request with information stored in the customer account;
   retrieving measured performance metrics associated with the plurality of host server computers, the measured performance metrics being based on how the plurality of host server computers are currently performing while running;
   selecting a host server computer of the plurality of host server computers based on the measured performance metrics;
   dynamically configuring one or more parameters of a hardware and/or a software resource associated with the selected host server computer in the multi-tenant environment in accordance with the retrieved configuration parameters; and
   launching the virtual machine on the host server, the virtual machine using the configured hardware and/or software resource.

2. The method of claim 1, further including using the configuration parameters to change properties of the virtual machine.

3. The method of claim 1, wherein the received customer request is an application program interface call including a tag used to retrieve the configuration parameters from the customer account by matching the tag with the information stored in the customer account.

4. A non-transitory computer-readable storage medium storing computer-executable instructions for causing one or more computing devices to perform a method of launching a virtual machine in a multi-tenant environment, the method comprising:
   receiving a customer request to launch a virtual machine in the multi-tenant environment;

retrieving performance metrics that measure a current executing performance of a host server computer in the multi-tenant environment;

selecting the host server computer based on the retrieved performance metrics;

in response to the request, retrieving configuration information associated with an account of the customer by matching information from the customer request with information stored in the customer account, the configuration information indicative of a desired behavior of the virtual machine in the multi-tenant environment;

using the configuration information, dynamically reconfiguring the selected host server computer operating in the multi-tenant environment, wherein the reconfiguring comprises configuring at least one setting of a hypervisor running on the host server computer; and launching the virtual machine on a dynamically reconfigured host server computer of the multi-tenant environment.

5. The non-transitory computer-readable storage of claim 4, wherein dynamically reconfiguring includes changing parameters on a hardware and/or a software resource in the multi-tenant environment that interacts with the virtual machine.

6. The non-transitory computer-readable storage of claim 4, wherein dynamically reconfiguring includes customizing parameters of the virtual machine that is launched.

7. The non-transitory computer-readable storage of claim 6, wherein customizing the parameters of the virtual machine includes modifying a configuration file used by a hypervisor of the host server computer to launch the virtual machine on the host server computer, the modifying based on the retrieved configuration information.

8. The non-transitory computer-readable storage of claim 6, wherein customizing the parameters of the host server computer includes setting up an IP address for a metadata server used by the virtual machine.

9. The non-transitory computer-readable storage of claim 4, wherein the configuration information includes a plurality of tags with different customized configurations of the virtual machine associated with each tag.

10. The non-transitory computer-readable storage of claim 9, wherein the customer request is a web services request that includes at least one of the plurality of tags.

11. The non-transitory computer-readable storage of claim 4, wherein dynamically reconfiguring includes one or more of:
configuring the host server computer used for launching the virtual machine within the multi-tenant environment;
configuring a network storage server computer associated with the virtual machine; and
configuring at least one network parameter for one or more communication networks within the multi-tenant environment.

12. A method of placing virtual machines in a multi-tenant environment, which includes a plurality of host server computers, comprising:
receiving a customer request to launch a virtual machine in the multi-tenant environment;
receiving customer input associated with at least one desired performance characteristic of the virtual machine to be launched;
receiving performance metrics associated with currently running virtual machines in the multi-tenant environment, the performance metrics being associated with measured processor or traffic throughput;
in response to the customer request, determining a host server computer from a plurality of available host server computers, upon which to launch the virtual machine by matching at least one of the performance metrics in the multi-tenant environment to the desired performance characteristic; and
launching the virtual machine on the determined host server computer.

13. The method of claim 12, wherein the determining of the host server computer further includes analyzing performance metrics not associated with the desired performance characteristics of the virtual machine.

14. The method of claim 12, wherein the performance metrics dynamically change in accordance with use of hardware resources in the multi-tenant environment.

15. The method of claim 12, wherein the performance metrics are associated with one or more of the following: real-time temperature, latency of the currently running virtual machines, CPU usage of the currently running virtual machines, network bandwidth, disk input/output associated with the currently running virtual machines, network throughput, or power consumption.

16. The method of claim 12, further including detecting that the launched virtual machine is no longer matching the desired performance characteristic and, in response to the detection, migrating the virtual machine to another host server computer that matches the desired performance characteristic.

17. The method of claim 12, wherein receiving customer input includes using a customer account number to obtain a policy document, the policy document including at least one of the desired performance characteristic.

18. The method of claim 17, wherein the policy document further includes configuration parameters for one or both of hardware resources and software resources within the multi-tenant environment.

19. The method of claim 12, wherein the multi-tenant environment includes a plurality of pre-configured virtual machine types, and the customer request to launch a virtual machine includes a customized virtual machine type that is not one of the pre-configured virtual machine types.

20. A system for launching a virtual machine in a multi-tenant environment, the system comprising:
a processor coupled to a memory in a management server computer in the multi-tenant environment, the management server operable to perform placement of one or more virtual machines in the multi-tenant environment; and
a customer database storing configuration information associated with an account of the customer, the configuration information comprising at least one configuration profile indicative of a desired behavior of the virtual machine in the multi-tenant environment, wherein the processor is operable to:
receive a customer request to launch a virtual machine in the multi-tenant environment;
select a host server computer within the multi-tenant environment based on the at least one configuration profile and based on measured performance metrics of the host server computer;
dynamically reconfigure the host server computer based on the configuration information associated with the configuration profile in the account of the customer; and
launch the virtual machine on the reconfigured host server computer.

21. The system of claim 20, wherein the processor is operable to modify a configuration file within a hypervisor of the host server computer hosting the virtual machine, based on the configuration information.

22. The system of claim 20, wherein the configuration information comprises hardware and/or software configuration information associated with one or more of:
- any virtual machine requested by the customer;
- a type of a virtual machine requested by the customer;
- a storage volume used by a virtual machine requested by the customer;
- a backup or a copy of a virtual machine requested by the customer;
- a tag associated with a customized configuration of a virtual machine requested by the customer;
- a firewall associated with a virtual machine requested by the customer; and
- a virtual network environment requested by the customer.

23. The system of claim 20, wherein the processor is operable to dynamically reconfigure at least one hardware and/or software resource associated with a plurality of virtual machines launched by the customer, the reconfiguring based on the stored configuration information.

* * * * *